Figures 1, 2:
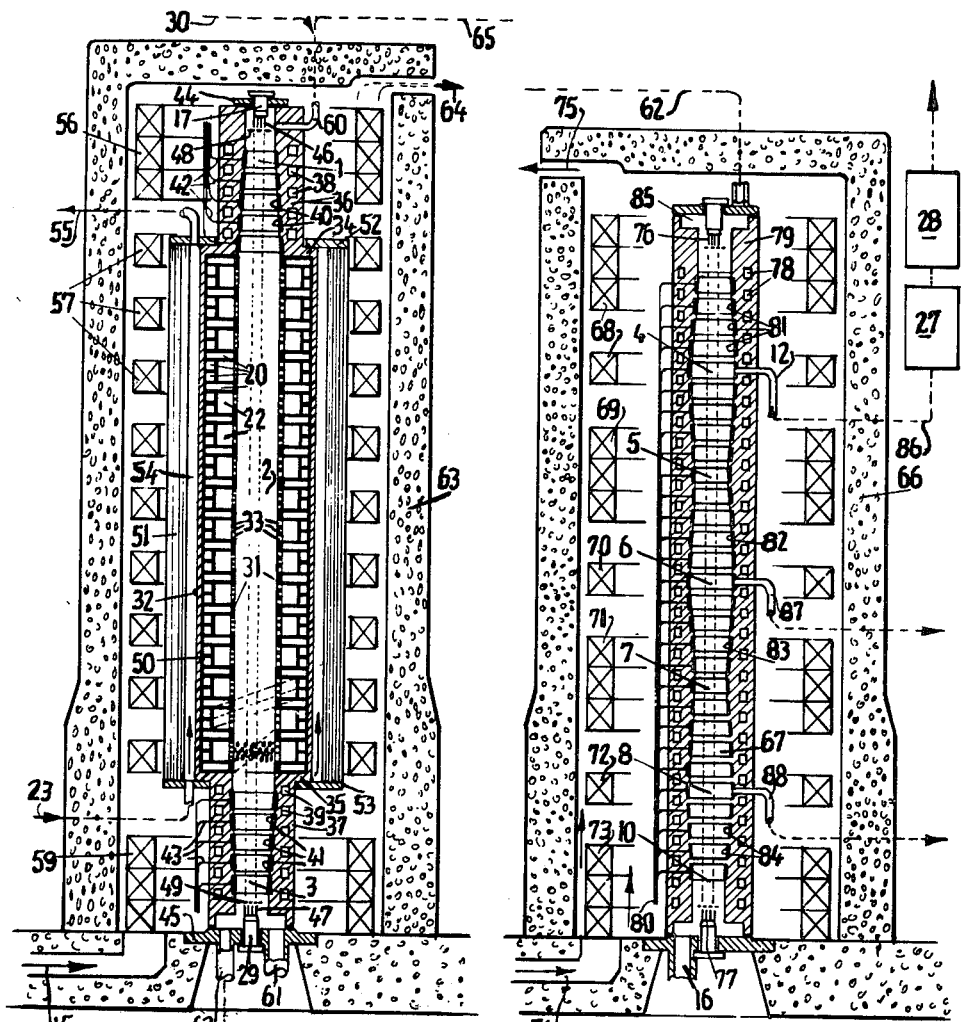

United States Patent [19]

Kistemaker

[11] 4,174,256

[45] Nov. 13, 1979

[54] REACTOR BASED ON A MAGNETOHYDRODYNAMICALLY DRIVEN SUPERSONIC GAS VORTEX

[75] Inventor: Jacob Kistemaker, Amsterdam, Netherlands

[73] Assignee: Ultra Centrifuge Nederland N.V., The Hague, Netherlands

[21] Appl. No.: 715,201

[22] Filed: Aug. 17, 1976

[30] Foreign Application Priority Data

Oct. 29, 1975 [NL] Netherlands .................... 7512635

[51] Int. Cl.$^2$ .............................................. G21C 1/24
[52] U.S. Cl. .......................................... 176/39; 55/3; 55/100
[58] Field of Search ................... 176/1, 6–9, 176/45, 39, 49; 60/202; 233/DIG. 1, DIG. 1A; 55/100, 135, 17, 3

[56] References Cited

U.S. PATENT DOCUMENTS

| | | | |
|---|---|---|---|
| 3,025,429 | 3/1962 | Gow et al. ................................ | 176/6 |
| 3,113,427 | 12/1963 | Meyer ..................................... | 176/9 |
| 3,117,912 | 1/1964 | Imhoff et al. ............................ | 176/9 |
| 3,277,631 | 10/1966 | Sunnen ................................... | 55/100 |
| 3,452,249 | 6/1969 | Cann ....................................... | 176/7 |
| 3,711,370 | 1/1973 | Van Ohawian et al. ............... | 176/39 |
| 4,046,527 | 9/1977 | Kistemalder ............................ | 176/9 |

OTHER PUBLICATIONS

Astronautics (10/59) Gaseous Core Nuclear Rockets pp. 20–27, 46–50, 102–104.
Nucleonics (8/57) Plasma React Promises pp. 50–55.
ARS Journal (7/61), Rosenzweig et al pp. 873–889.
ARS Journal (1/61) John et al. pp. 4–16.
Nucleonics, vol. 21, No. 7 (7/63) Gunson et al pp. 43–47.

*Primary Examiner*—Samuel W. Engle
*Assistant Examiner*—S. A. Cangialosi
*Attorney, Agent, or Firm*—Cushman, Darby & Cushman

[57] ABSTRACT

Nuclear reactor with a MHD driven gas-core vortex, that may be preceded by an enrichment section and followed by a reprocessing section, both sections based on gas-cores that are MHD driven gas-vortexes, in which the nuclear reactor functions with a mixture of e.g. $UF_6$ and one or more light gases such as $H_2$, DT, He.

3 Claims, 3 Drawing Figures

REACTOR BASED ON A MAGNETOHYDRODYNAMICALLY DRIVEN SUPERSONIC GAS VORTEX

The invention relates to a method for effecting a rotation of a mass of gas contained in a preferably rotationally symmetric housing wherein a gas discharge current flows according to an axially symmetric pattern inside a magnetic field with at least one non-zero vector component oriented normal to the electric current formed by positively charged particles extracted from said gas discharge, where the electrically charged particles from the gas discharge, which move at a high speed of rotation, set the total mass of gas into rotary motion by partial intermittent transfer of kinetic energy.

Such a process is known from NASA SP-236 1970, Vol. I, pp. 140–148, among other sources. The methods of this kind known up to the present appear to suffer from various disadvantages. In the known process use is made of gaseous or vaporous uranium and hydrogen to produce a nuclear reaction. But the use of uranium vapors involves some difficulties in practice, since in that case the temperature is about 10.000° K.

The applicant has discovered, however, that an analogous process is very well feasible if use is made of a mass of gas consisting of a mixture of a fissionable compound such as $UF_6$ on the one hand and light gases on the other, these light gases consisting of at least one inert gas such as helium or argon.

As compared with the method known from the aforecited NASA report, a further very important advantage is that, in the reaction chamber according to the invention, the magnetic field has the same axial direction throughout or has at least one component in this direction. This measure permits a gas rotation to be created which results in a highly effective pressure build-up. That is to say, the centrifugal field causes the mass of gas to be compressed, the pressure exponentially increasing from the axial center of the reactor towards the wall of the housing, slowly at the beginning and then very rapidly up to the wall, with a large pressure gradient to culminate at the wall in a thin layer with constant pressure.

The method described can be used not only to maintain a controlled nuclear reaction, but also to separate the gaseous components of the gas mixture from each other.

According to a further proposal, the process described is consequently applied by preference in such a manner that the gaseous mass is successively passed through different tiers of the housing lying one behind the other, whereby at least one of the following processes is successively brought about in the gaseous mass:
(a) enrichment by separation of the heavy and light isotopes of the heavy gases mentioned.
(b) nuclear fission reaction under production of heat in the fissionable gaseous mass, and
(c) gaseous reprocessing of the fission products under selective discharge of these products followed by return to the tier wherein the fission reaction takes place.

As a result, not only the reprocessing problem is greatly simplified and the accumulation is prevented of long-life radioactive fission products for which storage space must be found, but it is now no longer necessary to feed a reactor, designed to work with a uranium compound of a rather high degree of enrichment, with such a uranium compound in this highly enriched form.

It is sufficient to supply a uranium compound with a low degree of enrichment, which may be so low that the transport of the uranium compound is perfectly safe.

The energy produced by the energetic process described can be extracted in different ways from the systems required for this purpose, E.g., the reaction chamber can be cooled by a medium flowing along or through it, the heat of which is extracted in its turn for the production of electricity. It is also possible to extract the energy from the installation electromagnetically, not only from the reactor chamber itself but also from a possible MHD-section placed at the end of the cooling channel. Another method consists in using the kinetic energy of an emerging jet of light cooling gases for driving a gas turbine. The coolant mentioned can, if required, be conveyed through the reactor in a highly functional manner by feeding, adjacent the wall of the reactor housing but inside the cathode sections attached to this wall, an electrically conductive coolant through cooling coils, so that the interaction between an electric field between two electrodes in the cooling channel and a magnetic field parallel to the reactor axis results in a Lorentz force which causes the required coolant to move along. This coolant may consist, e.g., of helium gas or $UF_6$-gas made electrically conductive by the addition of an alkali metal, for example caesium. However, the coolant may also consist of a liquid metal, such as a sodium/potassium mixture. If a mixture of $UF_6$ and helium or $UF_6$ alone is used as the coolant, an additional advantage is obtained in that heat can be produced in the coolant by the neutron flux emanating from the reactor owing to the fact that part of the $U^{235}$ present in the coolant is split.

Extensive investigations have shown that the wall of the reaction chamber can be made very well of carbon (graphite) or of a carbon compound. The operating temperature of the proposed reactor will lie in practice between 1500° and 2500° K. At this temperature and pressure, the equilibrium of the system U-C-F appears to be such that the graphite wall will not be appreciably corroded while $UF_6$ is the predominant gaseous component. The parameters of the system can easily be chosen so that 98% $UF_6$ is in equilibrium with 1% F and 1% $UF_5$. In this case, the degree of enrichment of the uranium in the $UF_6$ used should be about 50% to keep the dimensions of the reaction chamber practicable, i.e. in the order of cubic meters.

It is practical to line the wall of the reaction chamber on the inside with ring-shaped or cylindrical electrodes electrically insulated from each other, while the inner wall is provided with circular rows of openings giving admission to the annular cavities surrounded and flanked by cooling channels. The gas fissionable by neutron capture is compressed in the aforementioned cavities through the fast rotation of the gas vortex to a pressure at which the density of this gas becomes so high that the critical state for nuclear fission is attained. The carbon used as structural material serves simultaneously as a suitable moderator to promote the neutron reaction.

To enable the separation of certain gaseous components to take place so that the selective discharge of a component becomes possible, a number of separation chambers is defined by a group of successive annular or cylindrical electrodes, the farthest rings or cylinders having the smallest diameter of the group, while the interjacent rings or cylinders culminate from both sides gradually in a largest diameter. The form of such a chamber makes it possible to discriminate between heavy and light gases. The heavy gases are compressed in the bulge of the bottle, whereas the lighter gases fill the center of the bottle also. An undesirable heavy component can in this way be discharged therefrom at the largest chamber diameter.

Figure 3:
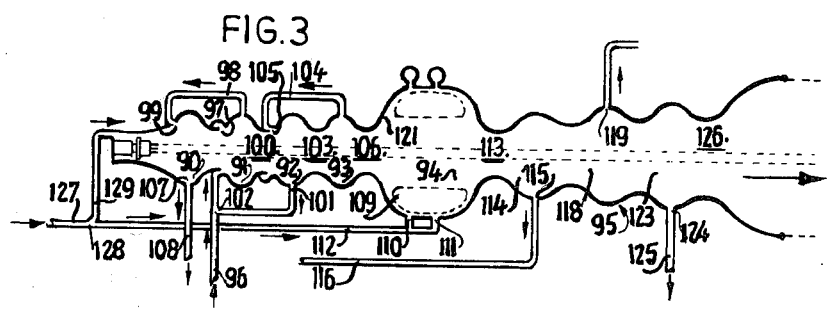

A few embodiments of the invention will now be explained in detail with the aid of three figures. These represent:

FIG. 1 — a schematic illustration of a horizontal cross-section over the length of a nuclear reactor according to the invention;

FIG. 2 — an analogous sectional view of an installation for reprocessing the fission products from the afore-said nuclear reactor;

FIG. 3 — a schematic illustration of a nuclear reactor according to the invention, provided not only with a reprocessing section but also with an enrichment section.

In FIG. 1, the rotation chamber is designated by reference 2. As a result of the gas rotation, the pressure in this space is relatively low while the reactor is in operation so that out of the gas mixture of heavy and light gases it is mainly the light gases that are represented in space 2. This rotation space is surrounded by a cylindrical wall 31 which extends over the entire length of the reactor vessel. This reactor vessel is bounded on the outside by a wall 32. Between the cylinder 31 and the outer wall 32 there is a number of annular chambers 22, communicating with the rotation space 2 via openings 33. Each chamber 22 is surrounded on both sides and on the outside by a number of cooling channels 20 mounted, in essence helically, around the reaction chamber. The walls of the compression chambers 22 and of the cooling channels 20 are of carbon. At the same time, these chambers are sometimes electrically insulated from each other in such a manner that different electric potentials can be applied to various sections if required; this concerns chiefly those portions where the magnetic field is stronger, that is to say the bottlenecks.

The outer jacket 32 terminates at both ends in end walls 34 and 35 which in their turn link up with parts 36 and 37 respectively. In these parts there are likewise cooling channels, designated by 38 and 39 respectively. These end-pieces are fitted with electrodes 40 and 41 which are here also electrically insulated from each other. A voltage is applied to each electrode via supply lines 42 and 43 respectively.

The rotation chamber is closed at both ends with covers 44 and 45 respectively. In each cover there is a bundle of electrodes 46 and 47 respectively, with a grid 48 and 49 respectively placed in front of it. The electrode bundles are fitted in electrode holders 17 and 29 respectively, which are solidly fixed in the covers 44 and 45. The electric potentials applied ensure together with the axial magnetic field, that a zone 1–3 will extend centrally through the rotation chamber 2 from the electrode bundle 46 to the electrode bundle 47, in which zone a gas discharge arc appears. An electric field is applied between this central arc and the electrode formed by the wall 40, 31 and 41.

Around the outer wall 32 there is a neutron reflector 51, enclosed between end-plates 52 and 53 which are connected to the covers 34 and 35. Between the reflector and the outer wall 32 of the reaction chamber a space 54 has been left free through which a coolant can flow to carry off heat from the reactor vessel. This coolant enters at 23 and can be discharged at 55. Magnet windings 56, 57 and 59 are fitted around the reflector over the entire length of the installation. An electric current flowing through these magnet windings produces a homogeneous axial magnetic field extending over the entire length of the reactor vessel. This field, however, is pinched at the ends under the effect of the coils 56 and 59. As soon as an electric potential is applied between the electrode configuration (46, 48) and (47, 49) on the one hand and the wall electrodes 40, 31 and 41 on the other, the mass of gas inside the rotation chambers 1, 2 and 3 will start to rotate at high speed. Inside the reactor, mainly the heavier gases consisting of $UF_6$ will now be compressed in the compression chambers 22. As soon as the pressure therein rises to a value of, e.g., 10 atmospheres, the conditions for a critical state will be satisfied, so that a neutron chain reaction can take place in these chambers.

To maintain this reaction, a stream of gas—e.g. $UF_6$—must be fed continuously to the rotation chamber via conduit 60. The gases processed by the reactor can be discharged through the conduit 62. Conduit 61 may be connected with a pump installation which is necessary in starting the rotor.

Heat developed in the magnet windings 56, 57 and 59 can be removed through cooling channels hollowed out inside the concrete structure 63 which surrounds the whole unit. E.g., a gaseous coolant can be supplied through conduit 15 in such a manner that it passes around all magnet windings, to be finally discharged at 64. As will be explained with the aid of FIG. 2, the gases discharged through conduit 62 can be subjected to a reprocessing procedure. The reprocessing installation according to FIG. 2 works electromagnetically in the same way as the reactor according to FIG. 1. The $UF_6$ that was still present in the gas discharged through conduit 62 is first separated and then discharged through the conduits 12, 86 and 65. This stream of $UF_6$-gas joins the gas stream 30 to be again fed through conduit 60 to the reaction space.

Since the electromagnetic operation of the reprocessing installation is based on the same principles as in FIG. 1, there is no need to go here into details again.

A rotation chamber 67 mounted inside a concrete casing 66 extends along the whole lengths of the installation. It is surrounded by magnet windings 68, 69, 70, 71, 72 and 73, cooled by a cooling stream supplied through conduit 74 and discharged through conduit 75. Electrode configurations 76 and 77 are here likewise attached to both ends of the vessel and ionize a gaseous central column 4, 5, 6, 7, 8 and 10 so that a gas discharge arc is maintained in it.

Inside an outer jacket 79 of the rotation vessel there are cooling channels 78. In this rotation vessel there are three zones 4, 6 and 8 which have larger diameters than the interjacent zones 5 and 7. It is possible to produce different speeds of rotation in the gas vortexes in the zones 4, 6 and 8 by applying, via the lines 80, a suitable voltage to each of the electrodes 81, 82, 83 and 84. The gases coming from the reactor vessel 2 are fed in through a conduit 62 so that they can enter the rotation chamber via the space 85. The speed of rotation in chamber 4 is chosen so that the $UF_6$ is separated from the fission products of the light gases, to be fed back to the inlet of the nuclear reactor through outlet 12 and via conduit 86, the filter units 27 and 28, and via conduit 65.

Gaseous fission products can be drained from the chambers 6 and 8 in the same manner to be discharged through the conduits 87 and 88 into collecting devices not illustrated here. There remains the light gas which is drained off through conduit 16.

If required, the enrichment section, the nuclear reactor and the reprocessing section can be combined in a single aggregate. This is illustrated schematically in FIG. 3, where the enrichment section consists of four zones 90, 91, 92 and 93, in which the enriched or depleted $UF_6$ gas mixture can be separated time and again, and that in such a way that the separated components are fed—as in a cascade—to other parts of the enrichment section wherein the same degree of enrichment prevails.

This enrichment section works otherwise substantially in the same manner as the reprocessing section as illustrated in FIG. 2 and already described. Furthermore 94 is the nuclear reactor and 95 is the reprocessing section already described.

The $UF_6$ to be enriched is supplied via inlet conduit 96 and is then fed to the separation space of stage 91 through inlet openings 97 arranged around the perimeter. As a result of the rapid rotation of the gas in this chamber, a separation takes place into the light and heavy components of the gaseous mixture. The heavy component is drained off at the largest diameter of this stage through conduit 98, which feeds it back to the inlet openings 99 in the separation space of stage 90. The light component is separated in stage 91 flows further through opening 100 to the separation space of stage 92. The heavy component is herein separated at the largest diameter of this chamber and drained off through conduit 101, which at point 102 joins the inlet conduit 96. The light gaseous components from chamber 92 are transported further through opening 103 to the separation space of stage 93. In this stage, the heavy components are drained off at the largest diameter of this separation chamber through conduit 104 which feeds this gaseous product back to the peripheral inlet opening 105 at the inlet of stage 92. The light gaseous components coming from stage 93 are fed through opening 106 to the space 94 where the nuclear neutron reaction takes place. The depleted $UF_6$ is discharged from the separation space of stage 90 at the largest diameter at 107 through conduit 108.

The $UF_6$ enriched in the stages 90, 91, 92 and 93 arrives finally in the reaction space 94 of the nuclear neutron reactor. Due to the considerably faster rotation of the gas mass in this chamber the enriched $UF_6$ which accumulates in zone 109 at the largest diameter of this chamber is compressed to such a degree that a uranium density develops sufficient to initiate a fission reaction. For the sake of simplicity, the neutron reflector 51 which is necessary for this purpose and is placed around the vessel 94 (see FIG. 1) is not illustrated in FIG. 3; neither are, for that matter, the annular wall electrodes which are present over the whole length of the system illustrated in FIG. 1 and the magnet coils which produce the magnetic field.

Light gases supplied through conduit 112 are injected into the reaction chamber through the openings 110 and 111. The inner wall of chamber 94 is cooled by a gaseous medium (not indicated). For the sake of simplicity, no liquid cooling is illustrated in FIG. 3, but it can be used.

Mainly the lighter gases from chamber 94 are discharged through opening 113 into the first separation chamber 114 of the reprocessing section 95. These heaviest gaseous products are separated in this chamber at the largest diameter of the rotating gas vortex through opening 115. These heaviest gases consist in part of $UF_6$ and are therefore fed back through conduit 116 to a junction point of appropriate concentration in the enrichment cascade. The heavy gaseous fission products from the next separation space 118 can be discharged through openings 119 at the largest diameter of this chamber. The lighter fission products are finally drained off from separation chamber 123 at its largest diameter through opening 124 so that they can be discharged via conduit 125 into a collecting space not illustrated here. The remaining light gases are finally discharged through opening 126. They can be used to generate energy in an MHD-system or in a gas turbine, they can be fed back to the light-gas inlet conduit 127, or can be used for propulsion purposes. Part of the light gases is branched off from conduit 127 at point 128 to be fed through conduit 129 to the inlet of the enrichment section.

I claim:

1. Apparatus for the stable confinement of a fast rotating gaseous mixture of a heavy gas component and a light gas component comprising: an elongated reactor vessel constructed for nuclear fission reactions having a wall of circular cross section and end covers; means for cooling the reactor vessel; at least one supply pipe for supplying a gaseous mixture of heavy and light components to the interior of the vessel; means for imparting rapid rotation to the gas in the center of the vessel so that the heavy gas component, by means of a high pressure gradient caused by centrifugal forces, moves to the inside of the vessel wall and so that the light gas component forms a central gas column extending axially in the vessel, said means for imparting rapid rotation including means for ionizing the gas column, means for inducing an axial magnetic field extending the length of the vessel so that the gas in the vessel is subjected to the field, and means including at least one electrode mounted on at least one end cover of the reactor vessel in the center of the cover, from which an ionized column of light gas extends along the central rotation axis of the gas mass, for producing a radial electrical potential between the ionizing means and the vessel wall; means for flowing the heavy gas component in the form of a gas envelope axially along the vessel wall and then axially in an opposite direction; and supply and discharge pipes communicating with the ionized gas column, and a neutron reflector-moderator jacket mounted between the wall of the reactor vessel and the magnetic field-inducing means, said vessel wall being lined with electrode rings which are electrically insulated from each other, openings being provided in the inner surface of the wall of said reactor vessel which give access to annular cavities surrounded by cooling channels, said inner surface and the walls of the cavities being made of carbon or of a carbon compound.

2. Apparatus as in claim 1 including a vessel for implementing an enrichment process and a vessel for implementing a reprocessing operation, wherein a number of separation chambers are defined by a group of electrode rings or cylinders succeeding each other, the outermost rings or cylinders of which have the smallest diameters of the group while the interjacent rings or cylinders culminate from both sides in a largest diameter thus forming a bottle-shaped cavity, and wherein the heavy component to be separated in each separation chamber is discharged at the largest chamber diameter through outlets placed there, wherein a selective part of the heavy gas component is drained off at the largest diameter of a zone and fed back to a previous zone.

3. Method for effecting a rotation in a mass of light and heavy gas components contained in a rotationally symmetric housing comprising effecting a gas discharge arc functioning as a central electrode along an axially symmetric pattern along the lines of force of an axial magnetic field, applying a radially symmetric electric potential between this central arc and the enveloping wall of the housing, under whose influence ions move in a radial direction from the arc to the wall producing thereby a radial electric current in the gas normal to the axial magnetic field, whereby a force is exerted on the partially ionized gas, which force as a result of the rapid rotation produced in this way compensates the frictional forces between the gas and the wall and thus produces a controllable stationary rotation, whereby light gas components and heavy gas components are compressed at the wall according to a pressure exponentially increasing with the radius, the pressure increase being attended by a separation of light and heavy gas components, in such a manner that the mass of gas passes successively through different zones of the housing lying one behind the other, wherein the wall of the vessel includes electrodes which form hollow chambers through which an electrically conductive coolant is propelled under the influence of the magnetic field present and of the local artificial radial electric fields.

* * * * *